(12) United States Patent
Munoz Utiel et al.

(10) Patent No.: US 11,363,164 B2
(45) Date of Patent: Jun. 14, 2022

(54) METHOD AND SYSTEM FOR AUTOMATICALLY VERIFYING THE AUTHENTICITY OF DOCUMENTS

(71) Applicant: SOTEC CONSULTING SL, Madrid (ES)

(72) Inventors: Armando Munoz Utiel, Madrid (ES); David Gonzalez Garcia, Madrid (ES)

(73) Assignee: SOTEC CONSULTING SL, Madrid (ES)

( * ) Notice: Subject to any disclaimer, the term of this patent is extended or adjusted under 35 U.S.C. 154(b) by 0 days.

(21) Appl. No.: 16/971,670

(22) PCT Filed: Mar. 7, 2018

(86) PCT No.: PCT/ES2018/070168
§ 371 (c)(1),
(2) Date: Aug. 20, 2020

(87) PCT Pub. No.: WO2019/170927
PCT Pub. Date: Sep. 12, 2019

(65) Prior Publication Data
US 2020/0406664 A1 Dec. 31, 2020

(51) Int. Cl.
*H04N 1/32* (2006.01)
*H04N 1/00* (2006.01)
(Continued)

(52) U.S. Cl.
CPC ......... *H04N 1/32347* (2013.01); *B42D 25/29* (2014.10); *B42D 25/333* (2014.10);
(Continued)

(58) Field of Classification Search
None
See application file for complete search history.

(56) References Cited

U.S. PATENT DOCUMENTS 6,012,048 A * 1/2000 Gustin ............... G07F 19/202
109/24.1
2002/0157005 A1 10/2002 Brunk et al.
(Continued)

FOREIGN PATENT DOCUMENTS

KR 10-2003-0091077 A 12/2003
WO 9913391 A2 3/1999
WO 2017207064 A1 12/2017

OTHER PUBLICATIONS

International Search Report for Corresponding International Application No. PCT/ES2018/070168 (28 Pages) (dated Nov. 26, 2018).

*Primary Examiner* — Miya J Williams
(74) *Attorney, Agent, or Firm* — Lucas & Mercanti, LLP (57) ABSTRACT

A method and system for automatically verifying the authenticity of documents is provided. The method has: scanning a document to be verified in the visible and ultraviolet light spectrum; detecting in the scanned document digital watermarks printed with visible and ultraviolet ink; decrypting the marks, thereby obtaining an ultraviolet mark identifier and a variable data mark identifier; validating the percentage of the mark by checking for the presence of the digital watermark in different areas of the scanned document; comparing the mark identifiers obtained with mark identifiers stored in a database; and determining the validity of the document on the basis of the comparison. The invention allows the validity of the data printed in the document to be checked automatically, reducing the possibility of the undetected falsification, modification or total or partial alteration of a document.

14 Claims, 8 Drawing Sheets

(51) Int. Cl.
*B42D 25/29* (2014.01)
*B42D 25/333* (2014.01)
*B42D 25/387* (2014.01)

(52) U.S. Cl.
CPC ....... *B42D 25/387* (2014.10); *H04N 1/00331* (2013.01); *H04N 1/00737* (2013.01); *H04N 1/32352* (2013.01); *H04N 1/32331* (2013.01)

(56) References Cited

U.S. PATENT DOCUMENTS

| | | |
|---|---|---|
| 2003/0056104 A1 | 3/2003 | Carr et al. |
| 2004/0153649 A1* | 8/2004 | Rhoads .................. G07D 7/004 713/176 |
| 2005/0060055 A1 | 3/2005 | Hallowell et al. |
| 2008/0010204 A1 | 1/2008 | Rackley, III et al. |
| 2012/0033264 A1* | 2/2012 | Sagan ...................... B41M 3/10 358/3.28 |
| 2012/0041877 A1 | 2/2012 | Rao |
| 2018/0144572 A1* | 5/2018 | Eschbach ............... G07D 7/005 |

\* cited by examiner

METHOD AND SYSTEM FOR AUTOMATICALLY VERIFYING THE AUTHENTICITY OF DOCUMENTS

CROSS REFERENCE TO RELATED APPLICATION

This Application is a 371 of PCT/ES2018/070168 filed on Mar. 7, 2018, which is incorporated herein by reference.

FIELD OF THE INVENTION

The present invention is comprised in the field of systems and methods for authenticating documents.

BACKGROUND OF THE INVENTION

There is worldwide concern about checking the veracity of documents (in paper or digitised format), particularly value documents such as promissory notes, delivery notes, cheques, bank drafts, among others, given the significant increase in the bank draft falsifications in different countries.

At present, conventional methods for checking the veracity of data contained in a document consist of non-automated manual verification. Thus, in the case of cheques, said verification consists of consulting the holder of the holder of the account against which the cheque has been issued, usually over the telephone, concerning the veracity of the data included in the document.

Current technologies for verifying documents, such as those mentioned below, have an isolated and limited scope, and there is no complete system which ensures checking for the authenticity of the document from the time it is printed until it is verified.

It is common for value documents to comprise luminescent inks in places wherein most falsifications take place. If security paper, devoid of optical brightening agent, is exposed to ultraviolet light, security fibres can be seen.

Another technology used for printing several graphical elements in documents (such as the bank identification number, account number or check number on cheques) is magnetic ink, which usually contains iron oxide. This ink is matte and is not distinguished by touch, whereas false numbers are usually glossy.

Other different document marking techniques are also used:
  Main background of the document: Printing performed with security fugitive inks which are reactive to aqueous agents, used both on the front and on the back.
  Auxiliary background: Printing with invisible inks which react under ultraviolet light and security fugitive inks reactive to organic solvents. In the case of cheques, these inks are used in the regions where amounts are written out in letters and numbers.
  Security background: In the case of cheques, this is located at least in the regions intended for the text that will be integrated by the client in the SCAN line.
  Anti-scraping: Certain relevant parts of the document are covered with an anti-scraping film or some other equivalent security measure sensitive to ultraviolet light. Thus, the routing code, check number and pre-magnetised SCAN line in cheques are covered with an anti-scraping film.

In certain cases, the paper document is prepared without fluorescence, with a dual-tone mark (watermark), and sensitised in order to produce chromatic reactions to chemical agents. The watermark or dual-tone mark is an important element incorporating in the paper, when it is manufactured, information which can later be observed when held up to the light (for example, the logo of the paper manufacturer, the logo of the paper printer, the logo of the bank to which it belongs, etc.).

Paper documents can use different types of printing:
  Offset systems: It is a flat print, without relief, and is always used for background printing in soft colours and for fluorescent inks.
  Intaglio system: It is performed with a plate engraved in low relief which, after being inking, presses against the paper in order to transfer the ink located in the recesses. This print has dark colours, gloss and relief to the touch. High cost for printing logos, microprint, OVI ink, latent images, etc.
  Laser printing: It is normally used for the variable data of the document (numbering, sacralisation, routing code, personalisation and magnetic characters) in black.

Different means of verifying physical adulterations in the document, applied for example to promissory notes, delivery notes, cheques, bank drafts, and others, are also known:
  Naked eye: Spots produced by substances used for erasing; background printing with a design that must not be discontinued or have any spots or scrapes; regular spacing and alignment of the numbering; raised paper fibres.
  By transparency: Spots, erasures and scrapes could be detected because in these sectors there will be a greater passage of light due to the thinning of the paper. Micro-interventions may also be seen because the glued portion of paper stands out when held against light.
  With ultraviolet light: Security background, invisible scrape protection backgrounds, data covered with invisible and fluorescent ink. They must all be intact because attempts at scraping or erasing leave spots that can be detected under this light.
  With a magnifying glass: This allows the modification of the background printing, invisible and fluorescent backgrounds, erasure of the microprints, clearing of the numbering in letters, modification of amounts and areas where scraping is suspected to be seen.

However, there is no known automated system or method which detects falsifications in documents having a complex life cycle and distribution, in which several depositaries intervene before their final validation. The present invention solves this problem.

DESCRIPTION OF THE INVENTION

The invention relates to a system and a method for automatically verifying the authenticity of documents, wherein:
  The registering of the data contained in the document (for example, a cheque) is entered through software.
  An encrypted code is embedded in the documents with variable data (digital watermarks—DWM—and ultraviolet marks).
  Decryption software for digital watermarks is used.
  A server with the databases of all the fields of the document, fixed fields and variable fields, is implemented.
  A communication system between the scanner, computer, the back-end and the database is implemented.
  A photocopy recognition/verification system based on semi-fragile marks and frequency analysis is implemented.

An image compression and transformation system (X9) is implemented.

A system for the area-wise search for semi-fragile codes is implemented.

The method for verifying the authenticity of documents comprises the following steps: scanning a document to be verified in the visible and ultraviolet light spectrum; detecting from the scanned document a digital watermark printed with ultraviolet ink and a digital watermark printed with visible ink (preferably printed with black toner); decrypting the digital watermark printed in ultraviolet ink, obtaining an ultraviolet mark identifier; decrypting the digital watermark printed with visible ink, thereby obtaining a variable data mark identifier; validating the percentage of a mark by checking for the presence of the digital watermark in different areas of the scanned document; comparing the mark identifiers obtained with mark identifiers stored in at least one database; and determining the validity of the document on the basis of said comparison. The scanning of the document preferably comprises a document OCR recognition step.

The method may further comprise a step of activating the document by the user who draws the cheque which in turn comprises obtaining activation data and sending it to the DB using a mobile device application, in addition to checking the DWM and the data related to same stored in a database In one embodiment, the ultraviolet mark identifier includes information about the batch number to which the document belongs, and wherein the method comprises validating said batch number.

The method preferably comprises a step of checking a photocopied document in order to analyse the scanned document using semi-fragile marks and frequency analysis, and determine whether or not it has been manipulated.

The method comprises the following steps prior to scanning: an offset marking process with ultraviolet ink for printing a mark identifier in the document with ultraviolet ink; and a marking process with visible ink for printing a variable data mark identifier in the document.

In one embodiment, the method comprises a step of validating mark percentage wherein the marked region of the scanned document is automatically analysed, area by area, in order to check for the presence of the digital watermark in the areas of the marked region, generating an alert about a possible adulteration of the document in the case of detecting the absence of the digital watermark in one or more areas. The step of validating mark percentage therefore comprises scanning by areas in the scanned document, detecting the presence or the absence of the digital watermark in the different areas of the scanned document, and determining the adulteration of the document based on said detections.

A second aspect of the invention relates to a system for automatically verifying the authenticity of documents. The system comprises a scanner configured to scan a document to be verified in the visible and ultraviolet light spectrum, and data processing means (implemented for example by a computer processor) configured to detect from the scanned document, a digital watermark printed with ultraviolet ink and a digital watermark printed with visible ink; decrypting the digital watermark printed in ultraviolet ink, obtaining an ultraviolet mark identifier; decrypting the digital watermark printed with visible ink, thereby obtaining a variable data mark identifier; comparing the mark identifiers obtained with mark identifiers stored in at least one database; determining the validity of the document on the basis of said comparison. The database wherein the ultraviolet mark identifiers and the variable data mark identifiers are stored may be part of the system or be an external element to which access is provided.

The present invention provides a series of advantages. Thus, when applied to cheques, for example, the invention adds an additional security layer to bank transactions with cheques, drastically reduces losses derived from falsified cheques, prevents human error when checking the veracity of cheques, streamlines communications between banking entities and reduces the number of days from the time a cheque is deposited until the transaction becomes effective, and it optionally includes the second activation of the cheque once it is issued by the holder of the account.

The invention allows the data with which the cheque was printed and filled out by the person drawing the cheque to be checked by the entity making payment, reducing the possibilities of a cheque being falsified, modified or completely or partially altered. For that purpose, it has various software tools adapted to the different hardware elements of the system, which allow, when it is presented to be cashed or to be deposited in an account, the original data with which it was printed and filled out by the person drawing it to be returned. Likewise, it incorporates a series of measures that hinder falsification, adulteration or modification.

The system of the present invention marks desired places with the desired information, and compares the previously marked information with information that reaches the branch. Neither the marking nor the reading in a specific location of the bank draft is necessary.

Furthermore, the present invention includes the recognition, both in digital documents and in physical documents, in the automatic process for verifying and processing documents. This allows all the participating elements (e.g. bank, users, companies) in this process to be communicated and to perfectly know the traceability of the document. Furthermore, it ensures security of the information by means of the system of semi-fragile imperceptible images and the area-wise search for same in the cheque, ensuring the secure payment of the cheque. The present invention refers to both physical documents and digital and digitised documents.

The present invention allows, on the one hand, new security layers to be provided to the documents. There are documents, such as promissory notes, delivery notes, cheques, bank drafts, among others, that are printed with ultraviolet ink. However, documents are not printed with an imperceptible code in ultraviolet ink that can furthermore be decrypted by a machine. Moreover, the relational system of a unique watermark in ultraviolet with the variable data that has been printed on it adds a control over the use of the paper document, and in the event that the variable data printed in the paper was made to disappear so as to adulterate it with other data, such data would have to belong to a document printed in the same batch, which adds another additional security layer to the system.

Moreover, adopting the present solution at an industry-wide level allows, in the case of the banks, the data saved by other entities about the cheque presented to be cashed to be known immediately, and in the event that the second activation app is further used, it will include all the data making up a cheque.

The application of a unique digital watermark per issued cheque on the variable data furnished by the bank to the printer, combined with the system for detecting digital watermarks in partial parts of the cheque allows it to be detected if any of the variable data has been modified, detecting "washed" or "scraped" areas, because both methods of adulteration cause the digital watermark to be missing in the place where the adulteration attempt has been applied. This allows not only a further layer of security during payment, but it further allows streamlining cheque clearing processes between current banks, causing the wait time for the cheque to become effective to be minimal and the money to be available almost immediately.

The present invention solves the problem of communication of the veracity of the data contained in cheques between different banking entities or between different branches of one and the same bank. The system solves the technical, logistic and time difficulty that can be seen today in verifying the literalness of cheques. With the adoption of this system, the need for the cheque to physically travel, which still occurs in many countries, disappears, bringing them closer to digital exchange.

In the present invention, verification and authentication is performed instantaneously and automatically, because the software itself has a decoding reader for watermarks in addition to a direct connection to the data bank wherein all the alphanumerical (or data) information of the cheque, as well as the information of activation of the cheque once it is issued is stored, regardless of the issuing bank.

In addition to confirming the veracity of each of the cheques, traceability of the cheque is automated, regardless of the banks emitting and cashing the cheques, adding an instantaneous nature to the operation.

In the present invention, encrypted information is introduced in the document and in the data that will be printed before it is physically printed, having a unique code for each mark, which allows for complete traceability of each printed document and its relation with the batch of paper used for printing, for example.

BRIEF DESCRIPTION OF THE DRAWINGS

What follows is a very brief description of a series of drawings that aid in better understanding the invention, and which are expressly related to an embodiment of said invention that are presented by way of non-limiting example of the same.

DETAILED DESCRIPTION OF THE INVENTION

The present invention relates to a system and method for verifying the authenticity of the literalness of documents, such as bank drafts. The system allows for the verification of the fixed and variable data of the document, in addition to the confirmation of activation by the holder (in the specific application to cheques).

The operation of the system is based on generating unique digital images of each and every one of the documents (in this case cheques), accompanied by the insertion of marks that are imperceptible to the human eye (digital watermarks) in each of the images that will be printed in the physical document, followed by the storage thereof in a database. Once the stenographic layer is incorporated in the document, the latter follows the normal course normal of production and distribution.

Figure 1:
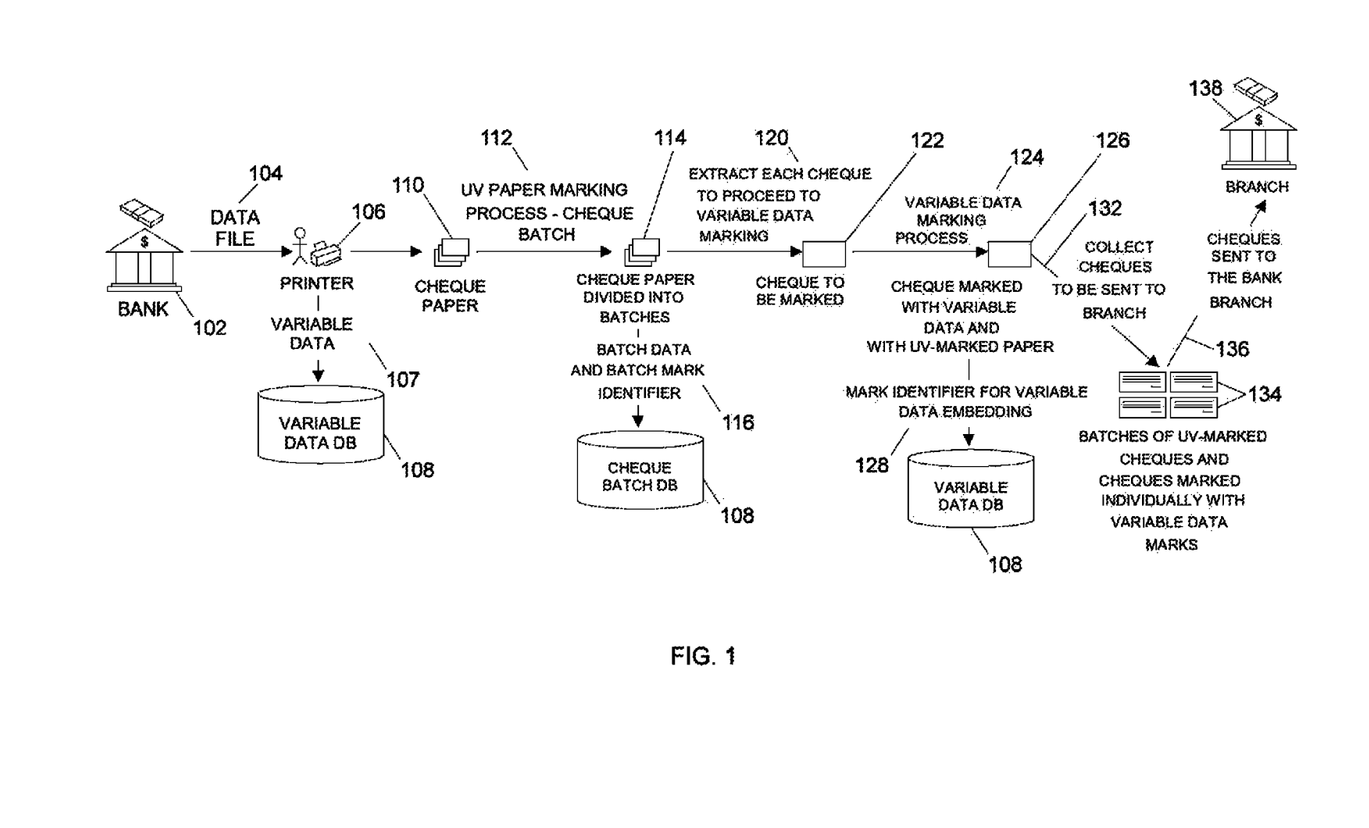
FIG. 1 shows a diagram of the steps for marking a cheque prior to it being put into circulation.

The details of the process are depicted in FIG. 1, which shows a diagram of the steps of marking a document (a cheque, in this particular case) prior to the circulation thereof. An issuing entity, for example a bank 102, sends to a printer 106 (i.e. printing entity or printing office) a data file 104 with variable data 107 which is stored in a database 108 (which can be implemented, for example, as a single database which can be accessed by both the depository entities involved in the process—such as the bank 102 for example—and the clearing house and/or the printing and digitisation service providers, or a database of the bank synchronised with a database of the printer have access). Although the databases where the information is stored are depicted in the figures as a single database with the reference 108, the different information can be stored in separate databases instead of in a single database.

The printer 106, starting from a set of unmarked documents 110 (e.g. check paper), executes an ultraviolet marking process 112 of documents by batches, thereby obtaining documents divided into batches 114 and storing the data of the batches and mark identifier by batches 116 in the database 108 (that is, the ultraviolet mark identifier related to the batch is registered in the database 108). The printer 106 subsequently extracts 120 each document in order to mark the variable data 107 received from the issuing entity 102, thereby separately obtaining each document to be marked 122. Then, the printer 106 then starts the marking process for marking the variable data 124 in each document to be marked 122, thereby obtaining a marked document 126 including the variable data 107 with paper marked with ultraviolet. For example, the variable data 107 marked per cheque may include the current account and document number, series and letters or internal codes of the institution, the name of the holder, and the coding of the institution, branch and security code. The database 108 is updated with the variable data inserting the mark identifier 128 used for each marked document, such that each piece of variable data has a mark identifier associated therewith. The documents are grouped 132 into batches of documents 134 marked in ultraviolet and individually marked with variable data marks. Said documents 134 are finally sent 136 to a destination entity, for example a branch 138 of a bank.

Figure 2:
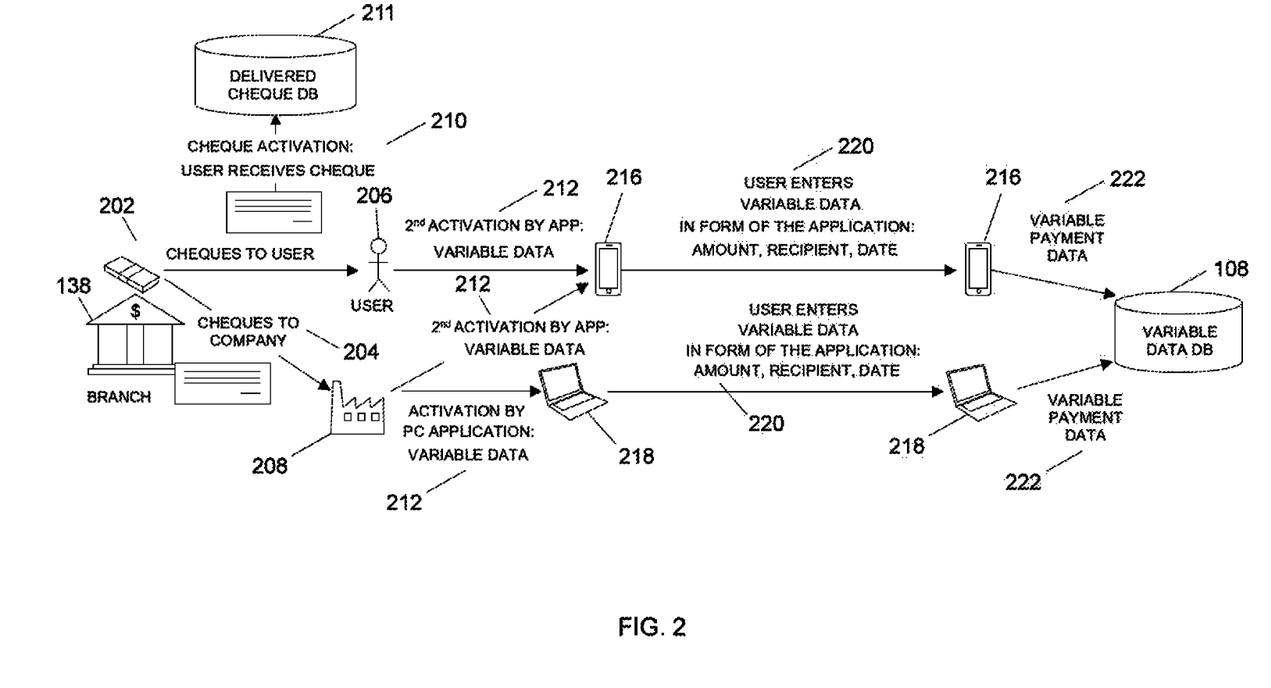
FIG. 2 illustrates a diagram of the process of activating a cheque.

FIG. 2 shows a diagram of the process of activating a previously marked document 134 (applied to cheques in the example of the figure). The marked document is sent (202, 204) to a user 206 or a company 208. When the user receives 210 a document, a delivered document database is updated 211. Once the cheque stub is received by the user 206 holding the account or the company 208, when a document is to be used as a means of payment, a second activation can optionally be performed 212 (an optional step providing a further security layer) through an application, either by means of a mobile device 216 (e.g. smartphone, electronic tablet) or a computer 218. At that time, variable payment data 222, including the payment data of the cheque (e.g.

numerical amount, written amount, date, city, signature) is registered 220 in the application, either manually or automatically by means of a reader, such as for example a camera of a device. This activation causes the variable payment data 222 to be automatically registered in the database 108 to which the bank has access. At that time, in the event that the bank has chosen to have the second activation system, the document shall possess validity (for example, in case of being a cheque, it will possess validity to be cashed in a branch bank). Therefore, the second activation 212 performs the function of reporting the variable payment data, such as the amount, date, signature, and activating the cheque for delivery as a means of payment, with said features.

Figure 3:
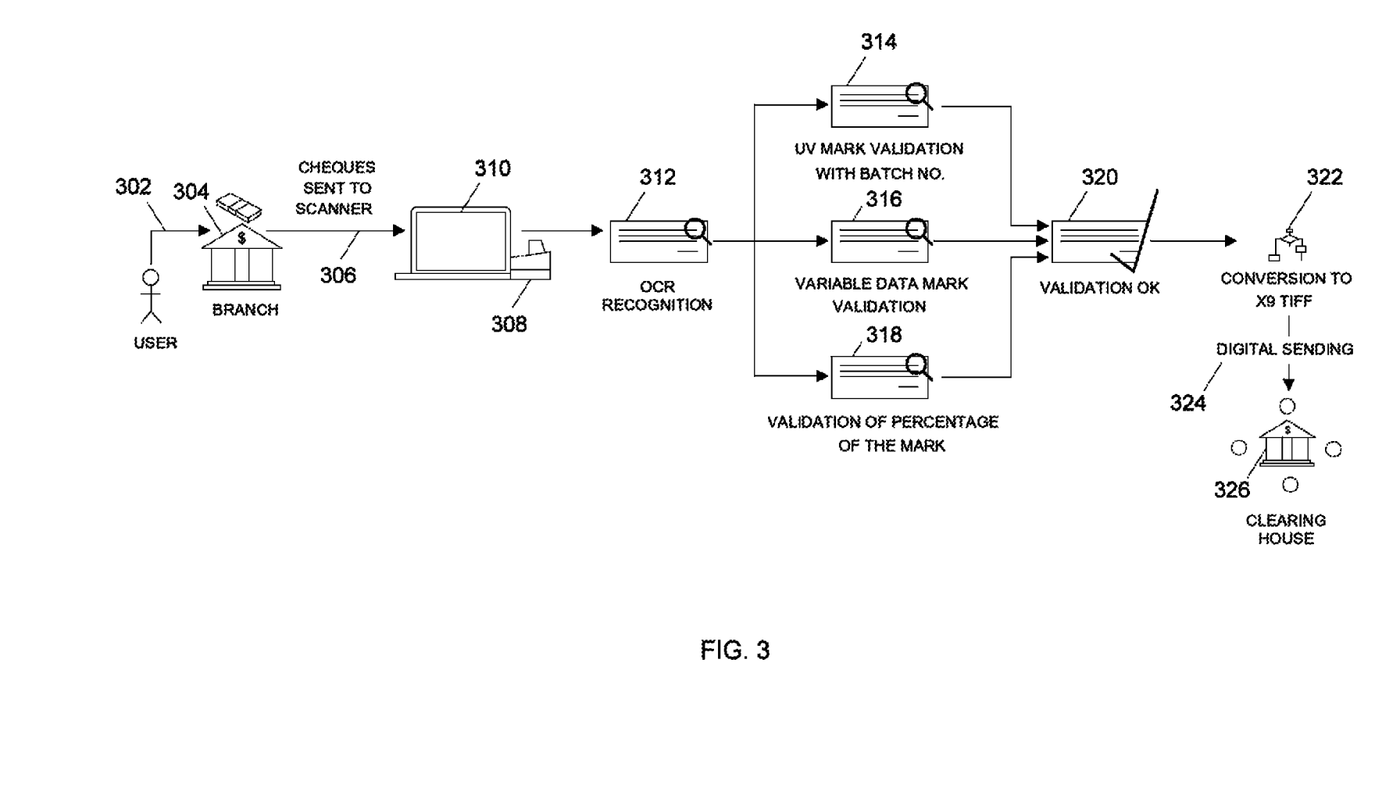
FIG. 3 depicts a diagram for verifying the cheque when it is cashed.

FIG. 3 shows a diagram for the verification of the document. Once the document 302 is submitted for verification by a verifying entity 304 (e.g. a branch of a bank), said entity scans 306 the document using a scanner 308 and a reading application 310 with the capability to read the codes printed in ultraviolet ink and the digital watermark, thereby accessing the information encrypted in the physical document and also digitally available in a database 108 to which the verifying entity 304 has access. Thus, the two pieces of information (the physical information of the document and the digital information of the database 108) are instantaneously compared, and the existence of the digital watermark and of the code in ultraviolet ink in the paper in which has been printed the document is checked. The reading application 310 carries out OCR recognition 312 on the document in order to obtain and validate the ultraviolet mark with batch number 314 and the variable data mark 316, and further performs a mark percentage validation 318. Digital watermarks, unlike other two-dimensional codes which only appear in one part of the document, can be imperceptibly repeated over the entire region of the document that has been marked. In the mark percentage validation 318 process, ad hoc software automatically analyses, area by area, the entire marked region to check for the presence of digital watermarks in all the areas of the marked region. In the case of detecting the absence of the digital watermark in one or more areas, the program sends an alert about a possible adulteration of the document. When a document is scraped or washed, it causes the digital watermark to disappear, which allows this method for detecting possible adulterations to be used. At that time, it is also verified if the document was previously activated (for example, authorised as the means of payment by the holder). If the document is veracious and the data is correct, it is registered in the database of the bank as a verified document 320. After the validation, that image in grayscale is transformed 322 into a TIFF in black and white with a series of certain parameters, which allows one of the systems most widely used in the digital exchange of images, the X9 system, to recognise the cheque. Subsequently, the previous image converted to a TIFF is sent 324 to the clearing house 326 to be analysed by the X9 system. 326. Once the image is analysed and the cheque cleared by the system of the clearing house 326, the image is returned to the banks with a validation.

Figure 4:
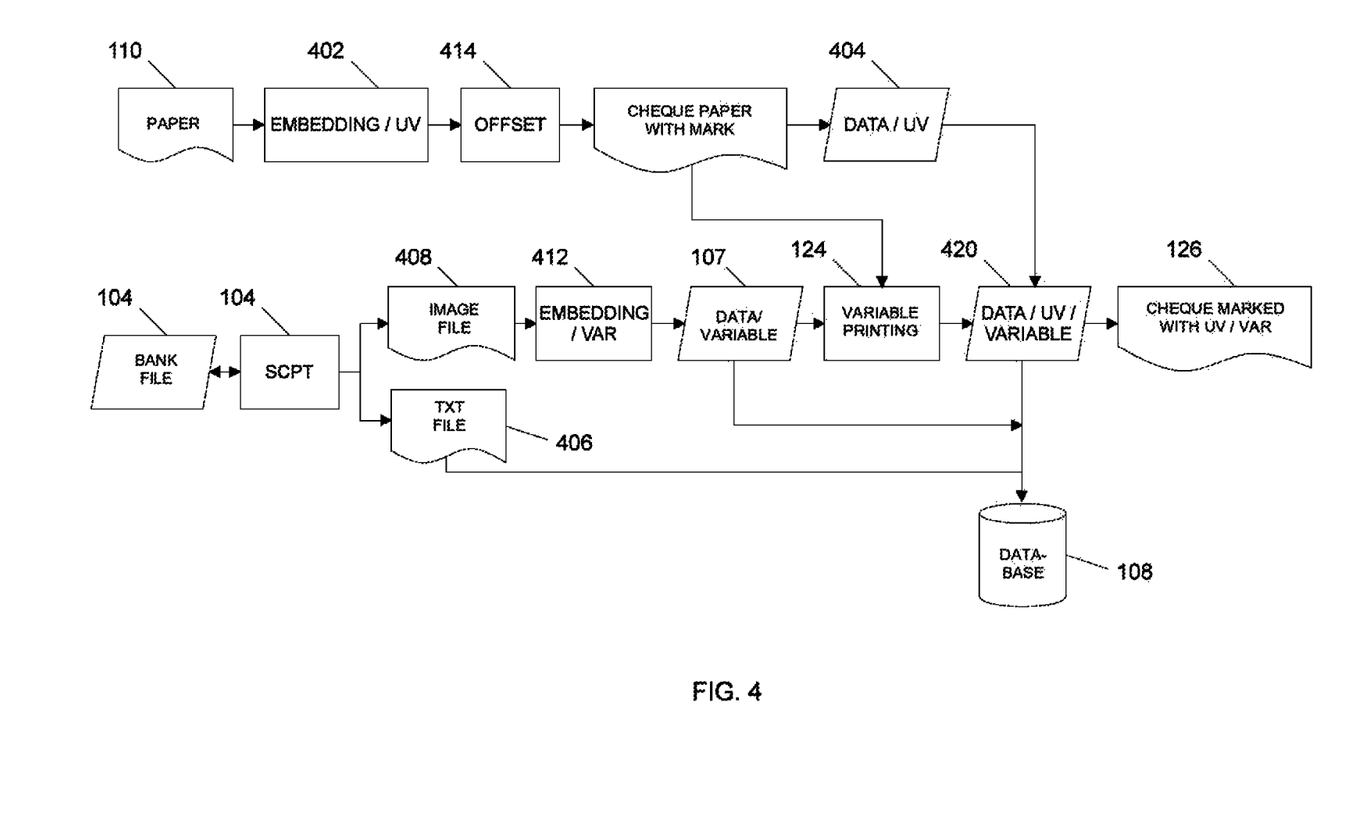
FIG. 4 shows a flowchart for the insertion of the marking in the document.

FIG. 4 illustrates a flowchart for the process of inserting marks in the document. The physical marking process for marking the document is performed in the printer 106 in charge of printing the documents. The information of the documents to be printed reaches the printer 106 through the means agreed on with the issuing entity (e.g. the bank 102). This information must be previously registered in the database of the bank, for subsequent updating at the end of the marking process, just as it must be registered in the database of the printer, such that the two databases (that of the bank and that of the printer) are synchronised, having the same information at all times.

The marking process for marking the document consists of two different types of marking:
Marking with visible ink, preferably black toner. The data of the digital watermark corresponds to the metadata or variable data of the document.
Offset marking with ultraviolet ink. The data of the digital watermark in UV corresponds to the information of the batch of cheques that is being marked, for the case of being applied with cheques (applied to other different documents, it may correspond to another piece of verification data). This type of mark is invisible to the human eye, being visible only under ultraviolet light.

In order to enable any of the two types of digital watermark to be embedded in documents, the raster or template to be printed on the documents for the marking thereof must be formed. This process can be performed in the printer 106 (but it could also be performed in the bank and the latter could send the file with the raster ready to be printed through the database or other means), wherein a software is installed which generates the information of said raster embedded with the mark in ultraviolet ink 402 and the raster embedded with the variable data mark 412, which will be printed, resulting in the document marked 126 with the data 420 (including the variable data 107 and information of the batch 404), which are stored in the database 108 of the bank. Based on the data file 104 sent by the bank 102 to the printer 106, two additional file types are generated. Moreover, a file is extracted in text format 406 (txt) with all the variable data 107 to be printed contained in the file sent by the bank, and moreover an image file 408 is generated with the same data, to which the digital watermark is subsequently added, being converted into the final art printed by the printer.

The marking process is performed according to the following steps:
Offset printing 414 of the raster with the watermark in ultraviolet with the information of the batch 404 to which the documents being marked belong.
Printing, by means of black toner, the raster made up of the digital watermark of the variable data 107 of each document and the text of the non-variable data.

Once the different batches of documents are printed and marked, an update process for updating the state of these documents is performed in a database, reporting that the documents are put into circulation and will be sent to banks for distribution. This update process can be performed automatically and in bulk using a scanner, reading the watermark of the documents, collecting the information of all the documents marked in the process and completing the database of the bank and of the printer with the information of the marking process, namely with the mark identifier. At the end of the activation process, there are two synchronised databases with each registration of the document with the information of the data 420 (variable data 107 and batch information 404) and the mark identifiers thereof.

Figure 5:
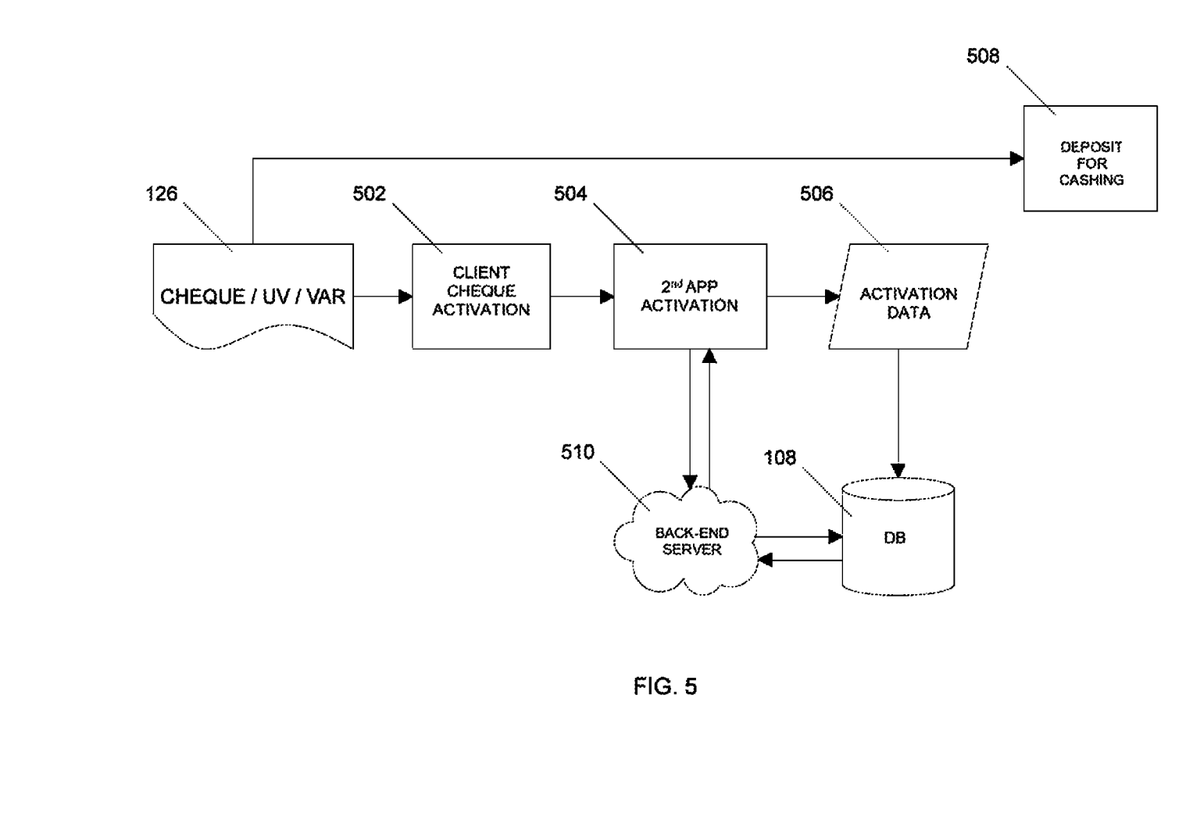
FIG. 5 depicts a flowchart for the process of activating the document.

FIG. 5 schematically shows a flowchart for the second activation process for a marked document, in this specific case a bank draft. Cheque stubs with marked cheques 126 from the bank are delivered to different clients. The bank performs a first activation of the document 502. These clients circulate the cheques completing the variable data with new data, such as the amount, amount written out in letters, the date, the recipient, the city. Before the client (user) delivers cheques to the recipients as a means of payment, a second activation of the document is performed

504 by an app downloaded in the mobile devices of users (i.e. clients). Through this app, the variable data digital watermark (printed with magnetic toner) contained in the document to be delivered must be read, and once it is identified activation data 506, which is stored in the database 108 of the bank using a back-end server 510, which contains the relationship between the digital watermark and the variable data 107, must be specified. The back-end server 510 also relates the user registered in the app with the variable data 107 of the cheque, in which the holder appears. Therefore, in their app, a client may only activate cheques belonging to them, given that the back-end server 510 relates the registration data in the app with the data contained in the digital watermark, the ownership of the document being included among such data. Furthermore, in that step the holder informs the database 108 about payment data, such as the amount and date, which is being generated at that time and will be checked when the cheque is presented to be cashed in the branch.

The activation data 506 is data generated by the holder at the time of using the document as a means of payment, and it is only reported in the second activation app, such that the bank does not know it beforehand. The activation data 506 is related to the digital watermark assigned to that cheque; that is, the holder of the cheque is related to a watermark. When the user enters the application with their user name and password, they are recognised as being the holder thereof. Once the second activation application is opened, by means of the camera of the mobile phone, said application recognises and decrypts the variable data water mark printed on the cheque and the system checks that it belongs to the registered user. At that time, the application allows the user to take a picture of the cheque (now with all the data completed, that is, amount in numbers, amount in letters, date, signature, beneficiary) or to complete a form in the app containing the same fields as the aforementioned data. Once the picture has been taken or the form has been filled out, it allows the user to send said data to the database by pressing the second activation button.

The activation data can be specified through two processes:
  Specifying the data by means of a form in the app: A form is presented to the user in the app which is completed by said user, writing in the different fields (amount, amount in letters, date, recipient, city).
  Collecting the data by means of a character recognition system (OCR): a picture can also be taken of the cheque with the camera of the mobile device, and the information of the activation data can be collected through an OCR system. In the event of not being able to obtain the data, the user is urged to perform the activation by means of a form.

Once the second activation process is performed with the activation data 506, the recipient who has received the cheque can cash it 508 in a bank branch. The bank branch then validates the document by means of a scanner which validates the watermarks integrated in the document and validates the variable data, as well as the correspondence thereof with the batch of paper registered in the database 108 of the bank.

Figure 6:
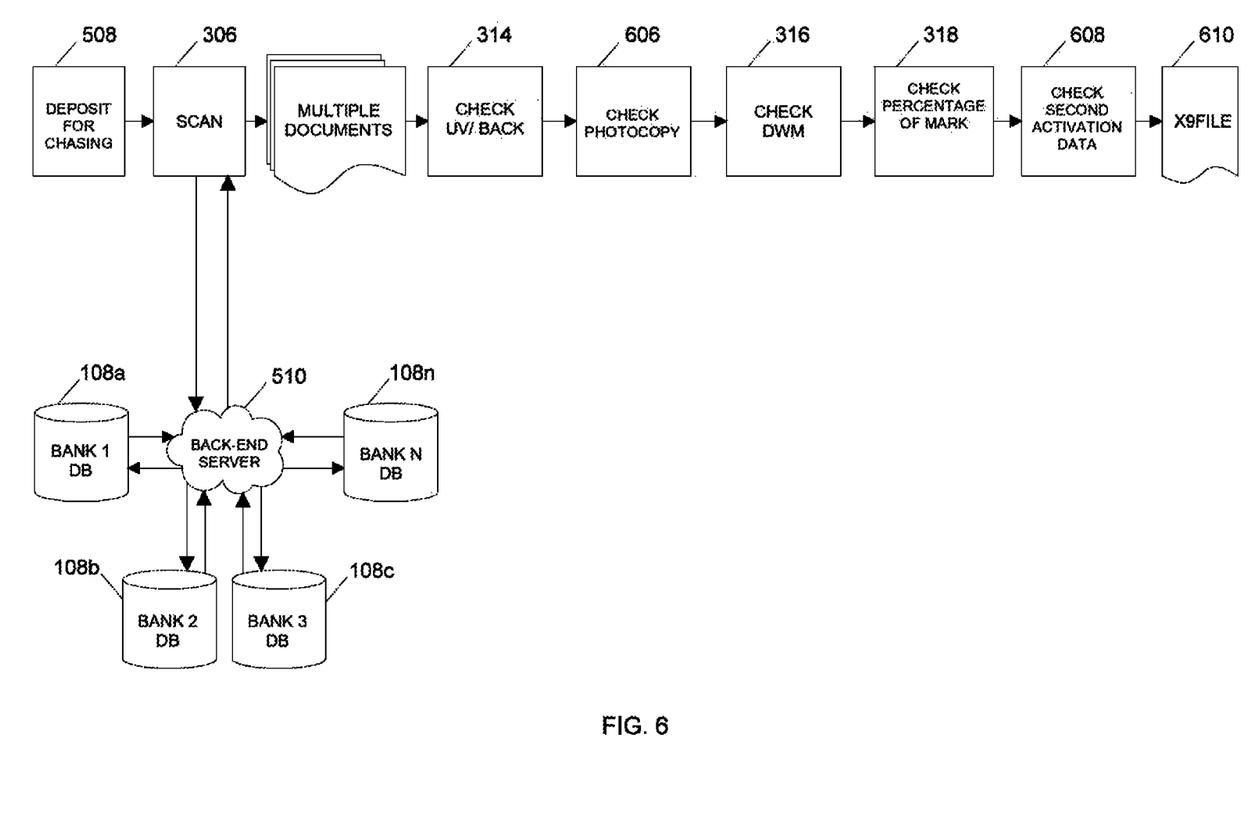
FIG. 6 illustrates a flowchart for the process of reading and scanning the document.

The software for reading documents by means of a scanner 308 is implemented in each branch. FIG. 6 shows an example of a flowchart for the process of scanning the document. After the process of scanning 306 the documents, the software implemented in the scanner decrypts the digital watermarks embedded in the documents, obtaining the mark identifier of both types, that of variable data and by ultraviolet. The information registered in the database (108a, 108b, 108c, . . . , 108n) of the corresponding bank (bank 1, bank 2, bank 3, . . . , bank n) is collected by means of these mark identifiers, ensuring that the correct data of the scanned document is obtained by means of the unique mark identifiers thereof. This data is the data activated by the bank when the cheque is put into circulation. The data of the second activation is also verified at that time in the event that said method is enabled by the bank.

After having obtained the data from the database 108 of the bank, the software of the branch compares this data with the data of the documents scanned by an OCR system (OCR recognition 312), checking the ultraviolet mark 314 with the batch number, checking photocopied documents 606 (process of detecting photocopies that identify is as being manipulated or not), checking the digital watermark 316 with the variable data, checking the percentage of the watermark 318 (process of searching for digital watermarks by areas of the document, identifying possible adulterations such as washing, scraping) and checking that the second activation data 608 in the event that this method is enabled. When scanning and reprinting a document processed with a digital watermark, the parameters of the image undergo a series of alterations which are detected by a software. Unlike the search by areas in the mark percentage validation 318 process, wherein it checks for the absence of the watermark, the process of detecting photocopies 606 looks for alterations in the entire image. In the event of a reading failure by the OCR system, the system notifies the failure and returns the data of the document that could not be validated. Lastly, once the document is validated, an image is generated in X9 format (610), based on the image captured by the scanner 308 in grayscale.

The scanner notifies possible fraud if any of the following conditions is met:
  The mark is not recognised or cannot be decoded.
  The number corresponding to the mark has already been cashed.
  The number has been manually discharged.
  The registered metadata (second activation data and variable data 107) does not correspond to those read by means of OCR.
  The mark is missing in an area of the document.
  The mark contains noise (adulterations), indicating that the document has been photocopied.
  The correlation of the watermark with the ultraviolet mark is not correct.

Once scanned and correctly validated, the cheque is registered in the database of the bank as being delivered and cashed.

Figure 7:
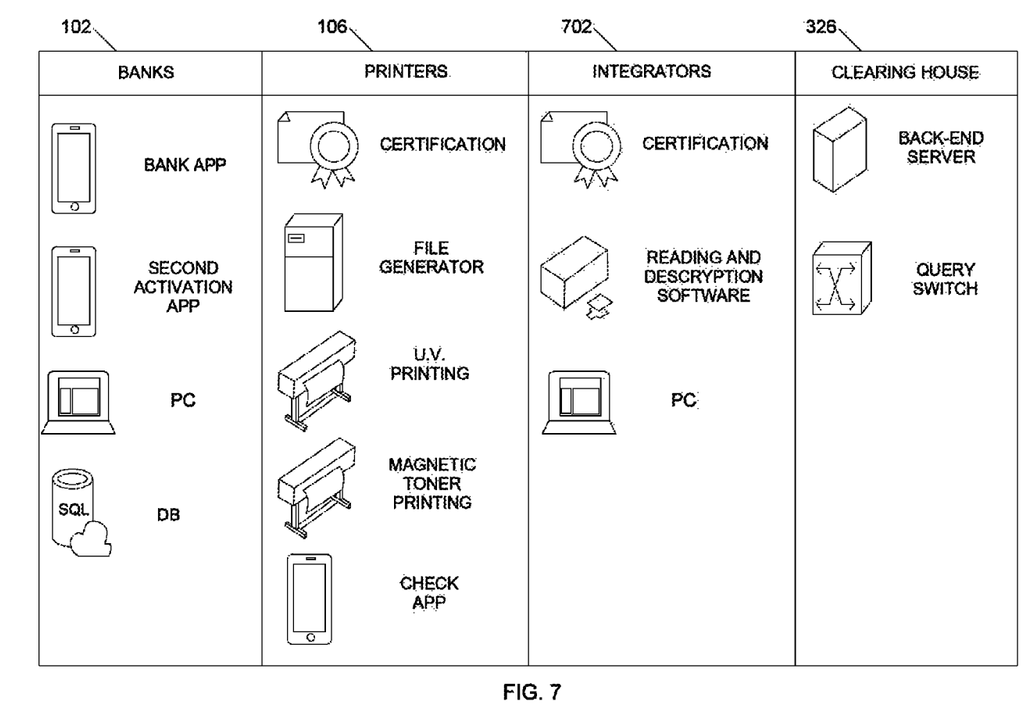
FIG. 7 shows an illustrative table with the different components and participating elements of the system for validating documents.

Components that can be used by the validation system of the present invention are described below in more detail. FIG. 7 shows an illustrative table with the different elements or components used by the different participating elements of the system for validating documents applied to bank drafts: banks 102, printers 106, integrators 702, and Clearing House 326. The integrators 702 are entities hired by banks to revalidate different types of tasks that the entity does not want to take on directly, and in this case integrators 702 refer to those companies that are in charge of digitising the cheques. These companies use their own digitisation software, which in turn is integrated with the management software of banking entities. The Clearing House 326 is the institution in charge of clearing balances derived from the activity between different financial entities in a country. It is an entity provided with a clearing system, in this case for clearing cheques between banks, wherein it registers all the cheques deposited in different financial entities, and offering the debit or credit balance at the end of each business day.

The system of the present invention can use:

A private digital watermark key: a unique digital watermark numerical key.

Embedding software with the function of associating a digital watermark with a non-compressed rasterised image file.

Marking control app capable of receiving postcript files, introducing one unique watermark per document and redirecting the output to another postcript file or printing server.

Certification and implementation: workflow and printing system analysis process for checking that they are consistent with the technologies and implementation of the pieces of software and pertinent pieces that ensure that the printer meets all the requirements necessary for printing documents with a digital watermark.

Software for checking photocopied documents which, by means of analysing a given image and several parameters related therewith, is capable of detecting artifacts in the image identifying it as being manipulated.

Software for the area-wise search for digital watermarks, capable of detecting adulterations in different areas of a given image by means of analysing the presence of the digital watermark in said areas.

Reading software for a computer and scanner which allows, given a scanned or non-rasterised and non-compressed image, the digital watermark contained in said image to be decrypted and interpreted.

Reading app for a mobile device allows the decryption of the digital watermark of an image obtained through the camera of the device and its relation with the previously registered data about the document (e.g. current account number, document number, series and letters or internal codes of the institution, institution coding, branch and security code, name of the banking institution, CMC7 character logo).

Reading app for ultraviolet marks, which allows the mobile device to decrypt the digital watermark printed in ultraviolet ink of an image obtained through the camera of the device and the relation thereof with the batch of cheque paper in which it was printed.

Activation software, which allows the digital watermark of an image obtained through the camera of the device to be decrypted, checking that the digital watermark that is read corresponds to a digital watermark assigned by the financial entity to the holder which must have previously been registered in the application. Once decrypted, it allows the user to add, by means of a form or a picture, the data they have filled out in the cheque (amount in figures, amount in letters, beneficiary, city, date and signature).

Image compression system which allows a .TIF document or a document in grayscale to be converted to a .TIF document in black and white with a size of less than 25 KBs.

Certification of scanner/implementation: workflow analysis process and capabilities of the system of capturing, transmitting and storing images and implementation of the pieces of software and pertinent pieces that ensure that the system of scanning, storing and transmitting of the entity complies with all the requirements necessary for suitable recognition of documents with a digital watermark.

Back-end: construction and implementation of a back-end (system for relating a digital watermark and data associated with the document).

Databases: creation and implementation of DBs for each of the participating financial entities with the content of the pre-printed data and the data added by the user.

Switch for communication between the financial entity making the query and the databases of the financial entity issuing the cheque through the back-end server.

The system uses a watermark encoder. By using stenographic techniques and cryptography (using a private key), the watermark encoder is capable of concealing a number of 64 bits (mark identifier) on a digital image, meeting the following requirements:

The image is not significantly deteriorated (slight noise is perceived).

The noise that is introduced cannot be reproduced on another image if it is not done through the encoder and a private key (cannot be falsified).

Transformations can be applied on the image (compression, noise, rotation, re-dimension, changes in contrast, brightness and any transformation that may occur between the process of printing and scanning the image), with there being a high possibility of the 64 bits of encoded information being conserved.

For the same number and the same private key, the noise entered when encoding the information is distributed uniquely each time.

The watermark encoder can be implemented by means of black toner or magnetic toner. The implementation using black toner works as follows:

An empty image with an 8-bit channel or higher (monochromatic) is created and a value is assigned to each identical pixel such that if the total number of bits is n, the first floor (2n/3) bits starting with the most significant bit are one (the remaining bits are decided based on the printer which will later print this image).

The watermark encoder technique is used to encode a unique number (mark identifier) which is registered in a DB in order to prevent it from being reused.

The image to be protected (i2), for example, an image containing the variable data of a cheque, is superimposed on this image (i1).

The resulting image is printed using only black toner and assuming that the paper contains a raster. The lower layer (i1) containing the concealed information is visually imperceptible.

The implementation of the watermark encoder using ink that is only visible under ultraviolet light is as follows:

Given a monochromatic digital image to be printed with UV ink, each pixel of the image is scanned, and if the value is not zero (no colour information), it is modified to the maximum value allowed by the channel. For example, if each pixel contains 8 bits of information wherein 0x00 means empty or blank and 0xFF means filled or black (depending on the coding of the image, it may be the other way around), that entire pixel, the value of which is not 0x00, is established as 0xFF.

For each area established as being black, the watermark encoder technique is applied using the same number in each area but never the same one per image file. This number is saved in a DB so that it is not used again.

The resulting image is printed using ultraviolet ink. Unlike the case with black toner, more than one copy of the same image is allowed to be printed, provided that they are in the same batch. The image is invisible except under ultraviolet light, wherein the outlines of the original image are visually perceived.

The system also uses a watermark decoder. Given a digital image that has been processed with the aforementioned watermark encoder and the private key that was used in the coding process, this algorithm allows the 64 bits that have been encoded (mark identifier) to be retrieved.

The watermark decoder can be implemented by means of a scanner. In this case, the printed image is digitised in a physical medium only one time. The algorithm of the watermark encoder is applied on the digital image in order to retrieve the mark identifier. Should it exist, this data can be related in a relational database with a larger number of data, such as the variable data of a document. In a first variant with a scanner with ultraviolet reading capacity, when the image is scanned ultraviolet light is applied in order to reveal an encoded image printed in UV ink. In a second variant, the algorithm of the watermark encoder is independently applied on several sub-areas of the digitised image for the purpose of identifying specific areas containing a mark identifier.

Alternatively, the watermark decoder can be implemented by means of a camera. In this case, the image exposed to the camera several times per second is digitised, a rectangular digital sub-image of the centre of the image is obtained, and the algorithm of the watermark encoder is applied on each sub-image until the mark identifier is able to be retrieved, at which time the digitisation is halted until the user intervenes again. Once the mark identifier is obtained, the data in a database can be related with a larger number of data, such as the variable data of a cheque.

The present invention also uses a system for verifying photocopies based on semi-fragile marks and frequency analysis. In order to identify digital images containing a digital watermark but which have been exposed to a printing and digitisation process for the purpose of obtaining fraudulent copies thereof (photocopies and/or scanning and printing), a mechanism for analysing patterns in the pixels of the image is used, which comprises:

a. Modifying the original image to be printed during the manufacturing process in such a way that it presents high energy at certain frequencies (repetitions of pixels) which are considered fragile due to the ease in which any attempt of scanning and reprinting the document would not be true enough (due to the technological limitations of most types of printers on the market) so as to conserve the energy in these areas in frequency.

b. During inspection and "detection" of a watermark in the digital image, inspecting these frequencies searching for the same level of energy that was applied in the printing phase. In turn, inspecting the level of energy present in the watermark as a second way to identify any possible adulteration.

Figure 8:
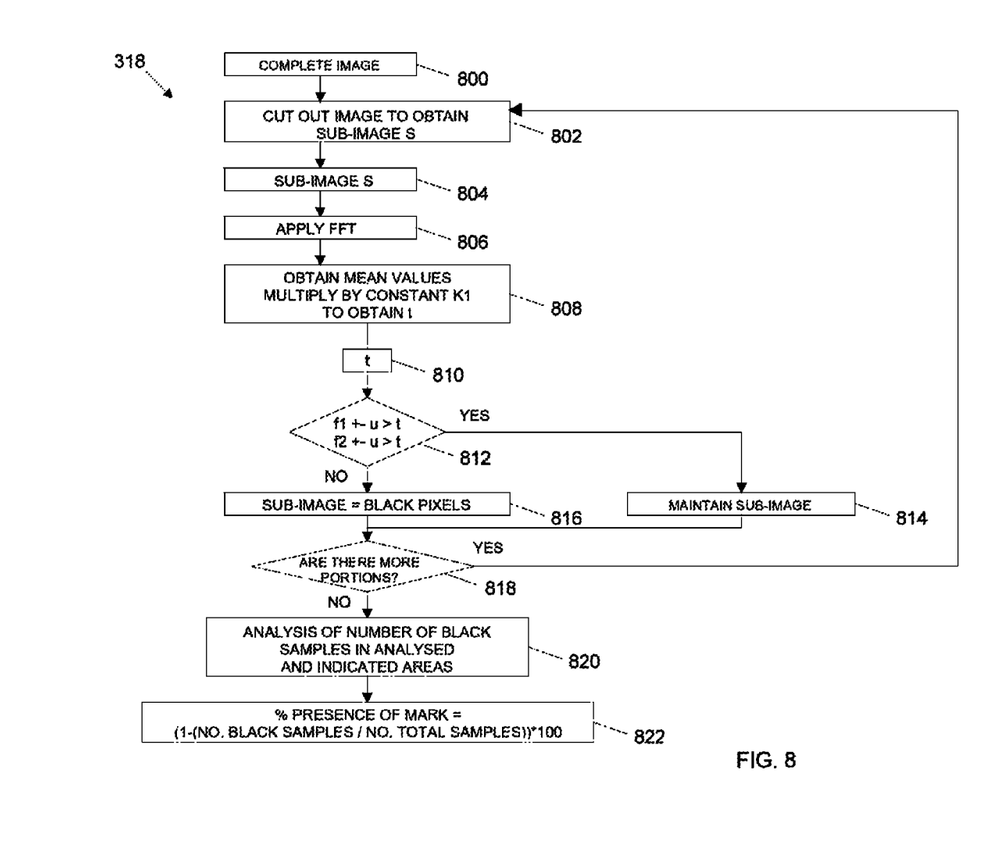
FIG. 8 shows the process of searching for the watermark in the document by areas according to a possible embodiment.

FIG. 8 shows a flowchart of the mark percentage validation 318 process, or for checking the percentage of the watermark, according to one embodiment. For that purpose, an area-wise search for the watermark is performed. The objective of this algorithm is to determine the presence of a digital watermark along the entire surface or duration of a multimedia file, such as a complete image 800 or a sound. Unlike other watermark reading algorithms, the purpose is to determine in which parts of the digital media there is a presence of the watermark without needing to determine which piece of data is encoded therein. The mark percentage validation 318 process comprises scanning the entire surface of the document in search of digital watermarks and detecting the absence of the digital watermark in any part of the surface of the document. The marked region of the scanned document is thereby automatically analysed, area by area, in order to check for the presence of the digital watermark in the areas of the marked region, generating an alert about a possible adulteration of the document in the case of detecting the absence of the digital watermark in one or more areas.

This process allows post-printing adulterations of an image I with a digital watermark to be detected, for which purpose there is proposed a reading algorithm F(S), where S is a sub-image of the image I having dimensions n×n, n being a power of 2. The function F returns a binary value (true or false) based on whether the sub-image S contains characteristics in the pixels indicating the presence of a digital watermark. The result of convoluting I with F(S) results in a binary image B in which black pixels (with value 0) represent the areas of the image wherein there is an absence of the watermark. After a given number m of black pixels consecutively grouped together, it is considered that an area of the image I has been adulterated.

The proposed solution consists of the following components:

a) A digital watermark presence detector with a response time of less than 500 microseconds for 4096 audio samples or a 64×64-pixel image with an algorithmic complexity of O(1).

b) An algorithm for transforming the original medium into a replica wherein the samples without the presence of a digital watermark are converted into silence in the case of audio, or black in the case of an image, so as to facilitate hearing or viewing the results. The algorithmic complexity is O(N).

The mark percentage validation 318 process therefore includes a first step of cutting out 802 a portion of the complete image 800 so as to obtain 804 a sub-image S of the original image I, the sub-image S being a square image having size n×n, with n<a (wherein 'a' is the height and width of the image to be analysed). Given an input digital signal S, the discrete Fourier transform is then applied 806 on it. In the case of a vector, such as an audio signal, the FFT (Fast Fourier Transform) algorithm is used, and in the case of a matrix, such as an image, the two-dimensional version, that is, the 2D FFT algorithm, is used. This function is referred to as F=FFT(S). Based on the results of applying the function F (a series of complex numbers with as many numbers as there are input samples), the absolute values or magnitudes thereof A=ABS(F) are obtained. The first result, which represents the 0 Hz frequency, is established as 0.

Then the mean M of all the absolute values A is obtained 808 and multiplied by a first constant $K_1$ so as to obtain 810 a magnitude threshold t: $t=M \times K_1$ Lastly, an error threshold u is set, which will subsequently be used to detect the watermark. This step is necessary for preventing false negatives due to factors such as rotation in the case of two-dimensional signals, scaling or re-sampling. The criterion for the error threshold u is the integral of the division of the number of samples (or the square root in the case of a two-dimensional signal) between a second constant $K_2$:

$$u=\text{floor}(\text{size}(S)/k_2)$$

With this data, the criterion for determining the existence of a watermark is if given two known frequencies, f1 and f2, the magnitudes in said frequencies or in the adjacent frequencies set by the error threshold u are greater than the magnitude threshold t, according to the check being performed in step 812. Both results must be positive in order to determine that there is a digital watermark present in the samples, and in this case the sub-image 814 is maintained. If both results are not positive, the pixels of the sub-image S are converted into black pixels 816.

It is then checked 818 if there are more portions of the complete image to be analysed, in which case the preceding process is repeated until the entire image 800 has been completely analysed. To end, the number of black samples in the analysed areas is analysed 820 and the percentage of the presence of a mark is obtained 822 according to the following formula: % presence of a mark=(1−(No. black samples/No. total samples))*100

The present invention can also implement an image compression and transformation system (for example, X9 for an application to cheques). The algorithm encoder X9 allows reducing the size (i.e. the amount of bits necessary to describe the file) of a digital image containing concealed information by means of the algorithm of the watermark encoder, converting the original 8-bit channel image into a 1-bit channel image (black and white), preserving the concealed information. The entire image is scanned, selecting sub-images. For each sub-image, a "density" value determined by the mean value of each pixel is obtained. If the density exceeds a certain threshold u1, the value of each pixel is established at 0. If the image is below a certain threshold u2, a third threshold u3 is established such that u3<u2<u1. The pixels with values below u3 are established at 0. The others are established at 1. If the density is between u2 and u1, a threshold u4 is established such that u2<u4<u1. The pixels with values below u4 (including the values below u2) are established at 0, the others (including the values above u1) are established at 1. Lastly, the image is put back together and encoded in TIFF Compression Fax3 G4 black and white, little-endian, single-layer format. The resulting image considerably decreases the size in the drive but preserves the legibility of the text and the concealed information.

The invention claimed is:

1. A method for automatically verifying the authenticity of documents comprising:
   scanning a side of a document to be verified in a visible and ultraviolet light spectrum;
   detecting in the scanned document a digital watermark printed with ultraviolet ink on the scanned side of the document and a digital watermark printed with visible ink on the scanned side of the document, wherein the digital watermark printed with visible ink is repeated over a marked region of the document imperceptibly to a human eye;
   decrypting the digital watermark printed with ultraviolet ink, thereby obtaining an ultraviolet mark identifier;
   decrypting the digital watermark printed with visible ink, thereby obtaining a variable data mark identifier;
   validating mark percentage by checking for the presence of the digital watermark printed with visible ink in the marked region of the scanned document, wherein validating mark percentage comprises:
      analyzing the marked region of the scanned document area by area;
      detecting the presence or absence of the digital watermark printed with visible ink in the different areas of the marked region of the scanned document; and
      determining an adulteration of the document based on said detections;
   comparing the mark identifiers obtained with mark identifiers stored in at least one database; and
   determining the validity of the document on the basis of said comparison.

2. The method according to claim 1, wherein validating mark percentage comprises obtaining a percentage of the presence of the digital watermark printed with visible ink in the marked region of the scanned document and determining the adulteration of the document based on said percentage.

3. The method according to claim 1, comprising a step of activating the document, which in turn comprises obtaining activation data using a mobile device application and storing said activation data in a database for a subsequent comparison with the data of the document.

4. The method according to claim 1, wherein the ultraviolet mark identifier includes information about the batch number to which the document belongs, and wherein the method comprises validating said batch number.

5. The method according to claim 1, comprising a step of checking a photocopied document in order to analyze the scanned document using semi-fragile marks and frequency analysis, and determine whether or not it has been manipulated.

6. The method according to claim 1, comprising the following steps prior to printing the document:
   an offset marking process with ultraviolet ink for printing the digital watermark with ultraviolet ink in the document;
   a marking process with visible ink for printing the digital watermark with visible ink in the document.

7. The method according to claim 1, wherein the visible ink is printed with black toner or magnetic toner.

8. The method according to claim 1, wherein the scanning step comprises Optical Character Recognition (OCR recognition) of the document.

9. A system for automatically verifying the authenticity of documents comprising:
   a scanner configured to scan a side of a document to be verified in the visible and ultraviolet light spectrum;
   data processing means configured to:
      detect from the scanned document a digital watermark printed with ultraviolet ink on the scanned side of the document and a digital watermark printed with visible ink on the scanned side of the document, wherein the digital watermark printed with visible ink is repeated over a marked region of the document imperceptibly to the human eye;
      decrypt the digital watermark printed with ultraviolet ink, thereby obtaining an ultraviolet mark identifier;
      decrypt the digital watermark printed with visible ink, thereby obtaining a variable data mark identifier;
      automatically analyze, area by area, the marked region of the scanned document in order to detect the presence or absence of the digital watermark printed with visible ink in the different areas of the marked region, and determine an adulteration of the document based on said detections;
      compare the mark identifiers obtained with mark identifiers stored in at least one database; and
      determining the validity of the document on the basis of said comparison.

10. The system according to claim 9, wherein the data processing means are configured to obtain a percentage of the presence of the digital watermark in the marked region of the scanned document and determine the adulteration of the document based on said percentage.

11. The system according to claim 9, comprising a database wherein ultraviolet mark identifiers and variable data mark identifiers are stored.

12. The system according to claim 9, wherein the data processing means are configured to analyze the scanned document using semi-fragile marks and frequency analysis, and determine whether or not it has been manipulated.

13. The system according to claim 9, wherein the data processing means are configured to perform OCR recognition of the scanned document.

14. The system according to claim 9, comprising a printer configured to print the digital watermark in ultraviolet in the document with information of the batch of the document.

\* \* \* \* \*